Dec. 27, 1932.  N. NIELSEN  1,892,074
CONVERSION OF PULVEROUS MATERIAL INTO A NODULIFORM STATE
Filed Nov. 28, 1930
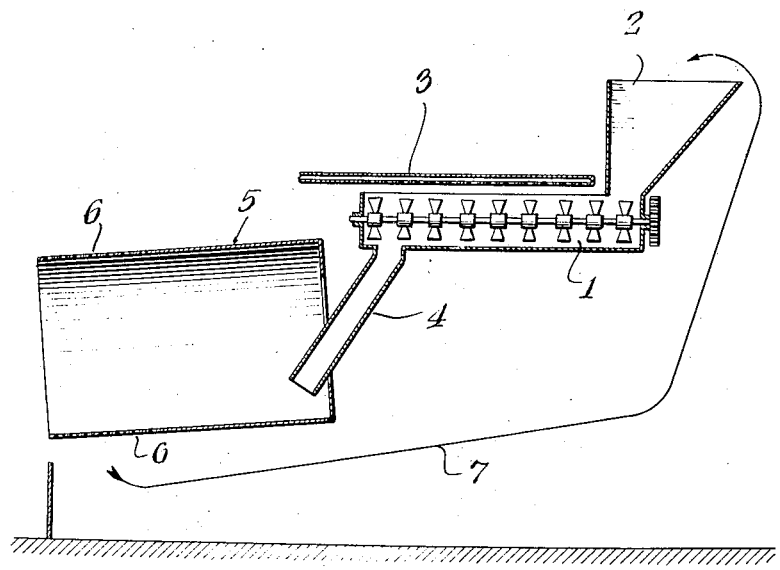
Inventor
Niels Nielsen
By his Attorneys
Redding, Greeley, O'Shea & Campbell Patented Dec. 27, 1932

1,892,074

UNITED STATES PATENT OFFICE

NIELS NIELSEN, OF COPENHAGEN, DENMARK, ASSIGNOR TO F. L. SMIDTH & CO., OF NEW YORK, N. Y., A CORPORATION OF NEW JERSEY

CONVERSION OF PULVEROUS MATERIAL INTO A NODULIFORM STATE

Application filed November 28, 1930, Serial No. 498,743, and in Great Britain May 13, 1930.

In the preparation of pulverous raw material for cement burning by the dry method experience has shown it to be desirable to convert the raw powder into lumps, or small bodies, or so-called nodules, before the raw material is introduced into the kiln. In this way the loss due to dust carried off in the stack is reduced and better conditions for the transfer of heat are created. Such a conversion of raw powder into nodules has been effected in various ways.

One of the best known of these methods is to stir the raw powder, while moistening it with water, in a short conveyor worm provided with means for adding moisture while mixing the mass. By this method, however, the formation of nodules is not altogether satisfactory as only a relatively small number of irregular moistened lumps will be formed, while a large portion of the raw powder will not be converted into lumps and, therefore, will leave the worm in a pulverous state.

Another known method is to allow the moistening and the formation of nodules to be effected in a rotary drum. The tendency of the material—especially when too much water is added—to adhere to the walls of the drum during the moistening and as well the difficulty of regulating the addition of water in a closed drum are serious objections to this method.

The present invention has for its object to overcome objections to both of the methods mentioned, and the invention consists in combining the advantages and avoiding the disadvantages of both methods, by adding the moisture to the pulverizous material during its passage through a mixing worm, as a separate operation, and thereafter directing the mixture of wet and dry material formed in this manner through a nodulizing drum without further addition of moisture.

In this way the objections incident to the heretofore known methods are overcome without the development of any new difficulties, and a considerably more efficient procedure than those heretofore known is attained.

The advantage gained in comparison with the known methods is mainly dependent on the fact that the irregularly shaped moistened lumps, which are formed in the mixing worm, take up additional raw powder while rolling in the nodulizing drum and thereby increase in size and become better able to resist mechanical actions and, at the same time, are prevented from adhering to the walls of the drum.

One form of mechanism for practicing the invention is shown diagrammatically in vertical section in the single figure of the drawing.

In the mechanism shown a moistening and mixing worm 1 is fed with raw powder through a hopper 2, while water is added to the material through a perforated pipe 3 extending longitudinally along the top of the worm. At the opposite end there is provided a downwardly inclined discharge pipe 4 which leads the mixture of dry and moistened material into a rotary nodulizing drum 5 through an opening in the end wall of the drum.

The worm conveys a mixture of irregular moistened lumps and raw powder into the drum 5, and while the mixture is rolling therein the raw powder in the mixture will constantly attach itself to the surface of the moistened lumps, which will assume more rounded shapes and, at the same time, be prevented from adhering to the drum wall.

It is difficult, however, to convert the entire quantity of material into nodules in one single working process and it may, therefore, be desirable to provide, at the discharge end of the drum, a screening surface or the like, as at 6, which serves to separate from the nodules the portion of the raw powder that has not been converted into nodules, but other devices for separating the raw powder from the nodules will readily suggest themselves to those skilled in the art. By means of a conveyor device, indicated on the drawing by an arrow-headed line, the separated pulverous material may be returned to the hopper 2 of the moistening and mixing worm and subjected to renewed treatment.

A preliminary drying of the nodules will increase the strength of the latter and may be effected as by passing hot air through the nodulizing drum or by heating the same from the outside.

I claim as my invention:

1. Apparatus for the conversion of material from pulverous into noduliform state comprising in combination a mixing worm, means to supply a moistening agent over an extended length of the worm, and a nodulizing drum receiving directly from the moistening and mixing worm the material treated therein.

2. Apparatus for the conversion of material from pulverous into noduliform state comprising in combination a horizontal mixing worm, means to supply a moistening agent over an extended length of the worm, and a nodulizing drum, the nodulizing drum being provided with a screen for the separation of the still pulverous material from the nodules.

This specification signed this 12th day of November A. D. 1930.

NIELS NIELSEN.